(12) United States Patent  
Wada (10) Patent No.: US 7,164,843 B2
(45) Date of Patent: Jan. 16, 2007

(54) DATA RECORDING SYSTEM AND RECORDING OBJECTIVE DETERMINATION DEVICE

(75) Inventor: Hirofumi Wada, Toyonaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1022 days.

(21) Appl. No.: 09/845,315

(22) Filed: May 1, 2001

(65) Prior Publication Data

US 2001/0041046 A1 Nov. 15, 2001

(30) Foreign Application Priority Data

May 2, 2000 (JP) .............................. 2000-133205

(51) Int. Cl.
*H04N 7/00* (2006.01)
*H04N 5/85* (2006.01)

(52) U.S. Cl. ........................................ 386/46; 386/125
(58) Field of Classification Search ................. 386/46, 386/45, 1, 125–126; 360/7, 91–92; H04N 5/76, H04N 5/781

See application file for complete search history.

(56) References Cited

U.S. PATENT DOCUMENTS

| 5,528,746 | A | * | 6/1996 | Yumine et al. ............. 715/840 |
| 5,838,577 | A | | 11/1998 | Tokano |
| 5,930,446 | A | | 7/1999 | Kanda |
| 6,311,011 | B1 | * | 10/2001 | Kuroda ........................ 386/46 |
| 6,538,692 | B1 | | 3/2003 | Niwa et al. |
| 6,678,462 | B1 | | 1/2004 | Chihara |
| 6,839,499 | B1 | * | 1/2005 | Lee ............................... 386/46 |
| 2001/0028785 | A1 | | 10/2001 | Okada |
| 2003/0161611 | A1 | | 8/2003 | Okada |

FOREIGN PATENT DOCUMENTS

| EP | 660 485 | 6/1995 |
| EP | 0 764 951 | 3/1997 |
| EP | 0 936 811 | 8/1999 |
| JP | 7-182768 | 7/1995 |
| JP | 9-25915 | 10/1997 |
| JP | 10-172237 | 6/1998 |
| JP | 10-269754 | 10/1998 |
| JP | 11-205313 | 7/1999 |
| JP | 2000-47829 | 2/2000 |

OTHER PUBLICATIONS

Kurioka et al., "Television Home Server for Integrated Services—Toward the Realization of ISDB "Anytime" Services", IEEE Transactions on Consumer Electronics, IEEE Inc., New York, US, vol. 44, No. 4, Nov. 1998, pp. 1195-1199.
Yehia, et al., "Storage System and the Multimedia Challenges", IEEE, Comput. Soc., US Aug. 13, 1997, pp. 388-393.
Copy of Japan Patent Office Action mailed on Feb. 14, 2006.

* cited by examiner

*Primary Examiner*—Robert Chevalier
(74) *Attorney, Agent, or Firm*—Smith, Gambrell & Russell, LLP (57) ABSTRACT

A data recording system including a plurality of recording devices for recording data containing images and/or voice in a prescribed recording medium, and a recording objective determination device that determines which particular one of the recording devices (among the plurality) will record data in a particular instance.

35 Claims, 6 Drawing Sheets

DATA RECORDING SYSTEM AND RECORDING OBJECTIVE DETERMINATION DEVICE

BACKGROUND OF THE INVENTION

1. Field of the Invention

The present invention relates to a data recording system, and a recording objective determination device for determining a recording device for recording data containing images and/or voice by selecting it from among a plurality of recording devices such as a VTR or and HDD.

2. Related Art of the Invention

Conventionally, in a system in which each of a plurality of recording devices such as an HDD (Hard Disk Drive), a VCR (Video Cassette Recorder) based on the standard such as a D-VHS standard, etc. is connected to a tuner through a control device, a user selects and determines a recording device for recording data containing an image and/or voice each time the user is recording data (program) transmitted from a broadcast station.

Figure 7:
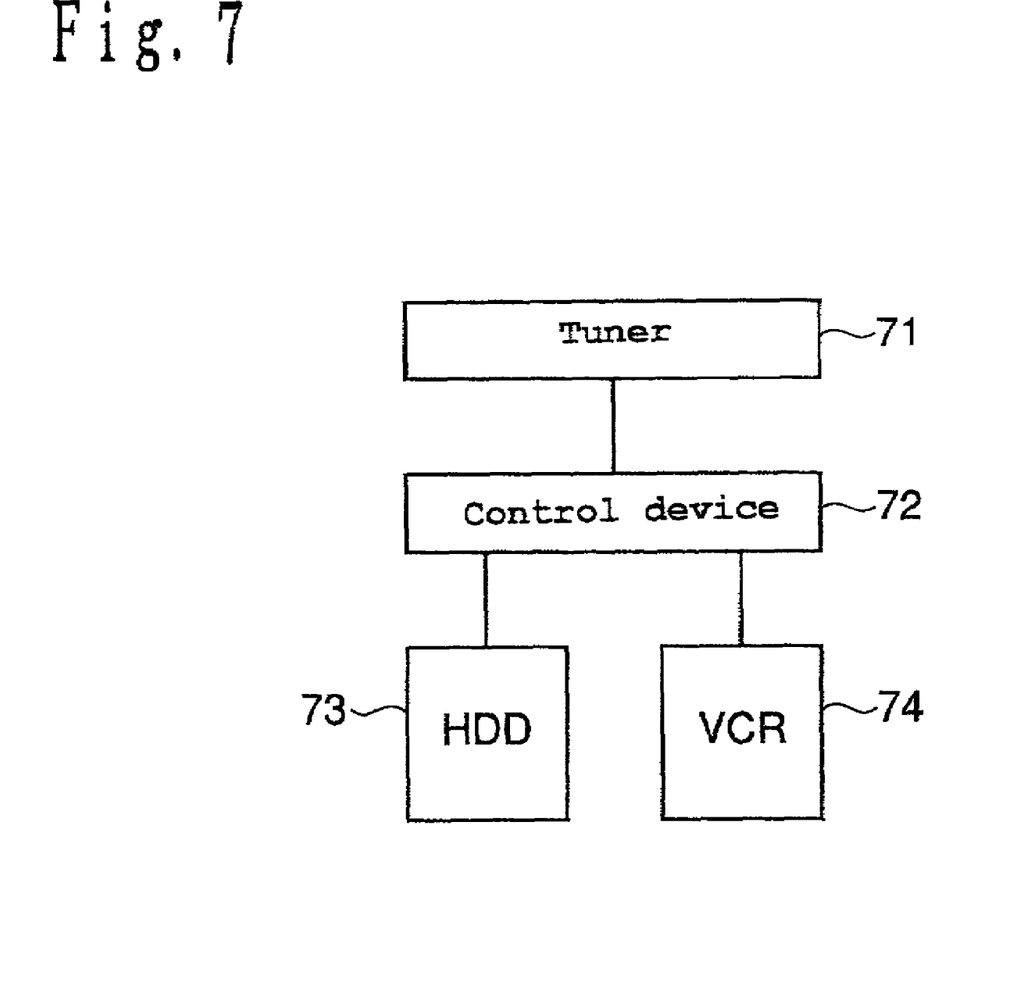
FIG. 7 shows a conventional image recording system.

To practically describe the above mentioned contents, FIG. 7 shows the configuration of the system in which an HDD 73 and a VCR 74 in accordance with a D-VHS standard are respectively connected to a tuner 71 through a control device 72.

In this system, when a user records the image data (program) received from a broadcast station in a cassette tape set in the VCR 74, the user sets conditions in the control device 72 when recording data in real time and when reserving the recording process such that the image data can flow to the VCR 74, and can be recorded on the cassette tape set on the VCR 74.

As described above, when there are a plurality of recording devices, a user conventionally has to select and determine a recording device for recording data each time the data is recorded.

SUMMARY OF THE INVENTION

The present invention has been developed to solve the above mentioned conventional problems, and aims at providing: a recording objective determination device for automatically determining a recording device for recording data in a predetermined method without asking the user to determine it each time the data is to be recorded; and a data recording system including the recording objective determination device and a plurality of recording devices.

The 1st invention of the present invention is a data recording system, comprising:

a plurality of recording devices for recording data containing images and/or voice in a prescribed recording medium; and a recording objective determination device comprising at least recording objective determination means of determining by a predetermined method, recording device for recording the data among said plurality of recording devices.

The 2nd invention of the present invention is a recording objective determination device, comprising at least:

recording objective determination means of determining by a predetermined method, a recording device for recording data among a plurality of recording devices each which records data containing images and/or voice in a recording medium, wherein when the data is recorded, the data is recorded in the recording medium of said recording device determined by said recording objective determination means.

The 3rd invention of the present invention is the recording objective determination device according to 2nd invention, wherein said predetermined method is to select any of said plurality of recording devices predetermined by a user.

The 4th invention of the present invention is the recording objective determination device according to 3rd invention, wherein at least one of said plurality of recording devices is a recording device using a removable recording medium of recording the data in a removable recording medium mounted on the device; and said recording device selected in advance by the user is said recording device using a removable recording medium.

The 5th invention of the present invention is the recording objective determination device according to 2nd invention, wherein said user can select a mode in which said user can optionally select a recording device for recording the data; and said recording objective determination device further comprising selection receipt means of accepting a selection of the user as to which mode is to be selected, a mode in which said recording objective determination means selects a recording device and a mode in which the user optionally selects a recording device.

The 6th invention of the present invention is the recording objective determination device according to 5th invention, further comprising use frequency check means of checking a use frequency of each of said plurality of recording devices in the past, wherein when said selection receipt means accepts the user selection of the mode in which said recording objective determination means determines a recording device, said recording objective determination means selects a recording device having a highest use frequency checked by said use frequency check means as a predetermined method.

The 7th invention of the present invention is the recording objective determination device according to 2nd invention, wherein at least one of said plurality of recording devices is a recording device using a removable recording medium of recording the data in a removable recording medium mounted on the device; and said predetermined method refers to a method of selecting said recording device using a removable recording medium when said removable recording medium is mounted on said recording device using a removable recording medium.

The 8th invention of the present invention is the recording objective determination device according to any one of 2nd to 7th inventions, wherein when a remaining recording capacity of said recording medium in said recording device for recording objective determined by said recording objective determination means is equal to or smaller than a predetermined capacity, or when it is prohibited that data is newly recorded in said recording medium, said recording medium of said selected recording device for recording data does not record the data.

The 9th invention of the present invention is the recording objective determination device according to any one of 2nd to 6th inventions, wherein at least one of said plurality of recording devices is a recording device using a removable recording medium of recording the data in a removable recording medium mounted on the device, and at least another recording device of said plurality of recording devices is a recording device using a fixed type recording medium recording the data in a fixed type recording medium; and said recording objective determination device further comprising control means of controlling the data such that when said recording device for recording data, determined by said recording objective determination means is said recording device using a removable recording medium, and (1) no recording medium is mounted on said recording device using a removable recording medium, or (2) a remaining recording capacity of the mounted removable recording medium is equal to or smaller than a predetermined capacity, or (3) it is prohibited that data is newly recorded in said mounted removable recording medium, the data can be recorded in the fixed type recording medium of said recording device using a fixed type recording medium, and (1) after the removable recording medium is mounted on said recording device using a removable recording medium, or (2) after the removable recording medium having a predetermined amount of remaining recording capacity is mounted on said recording device using a removable recording medium, or (3) after the removable recording medium permitted to record new data is mounted on said recording device using a removable recording medium.

The 10th invention of the present invention is a program for causing a computer to serve as all or a part of:

said recording objective determination means of determining by a predetermined method, a recording device for recording data among a plurality of recording devices each which records data containing images and/or voice in a recording medium; in a recording objective determination device of 2nd invention.

DESCRIPTION OF SYMBOLS

1 Antenna
2 First tuner
3 Data decoding unit
4 Microcontroller
5 Memory
6 Second tuner
7 Picture-voice encoding unit
8 Recording objective determination device
9 HDD
10 VCR
11 Picture-voice decoding unit
12 Picture-voice graphic switch unit
13 CRT
14 Speaker
15 Infrared remote controller
16 Infrared reception unit
17 User mode
18 Automatic mode
19 Mode selection reception means
20 Recording objective determination means
21 Recording and reading control means
22 Recording objective determination device
23 Recording objective determination means
24 Recording and reading control means
25 Use frequency check means

PREFERRED EMBODIMENTS OF THE INVENTION

The embodiments of the present invention will be described below by referring to the attached drawings.

Embodiment 1

Described below first will be the configuration of the data recording and reading system according to embodiment 1 of the present invention.

Figure 1:
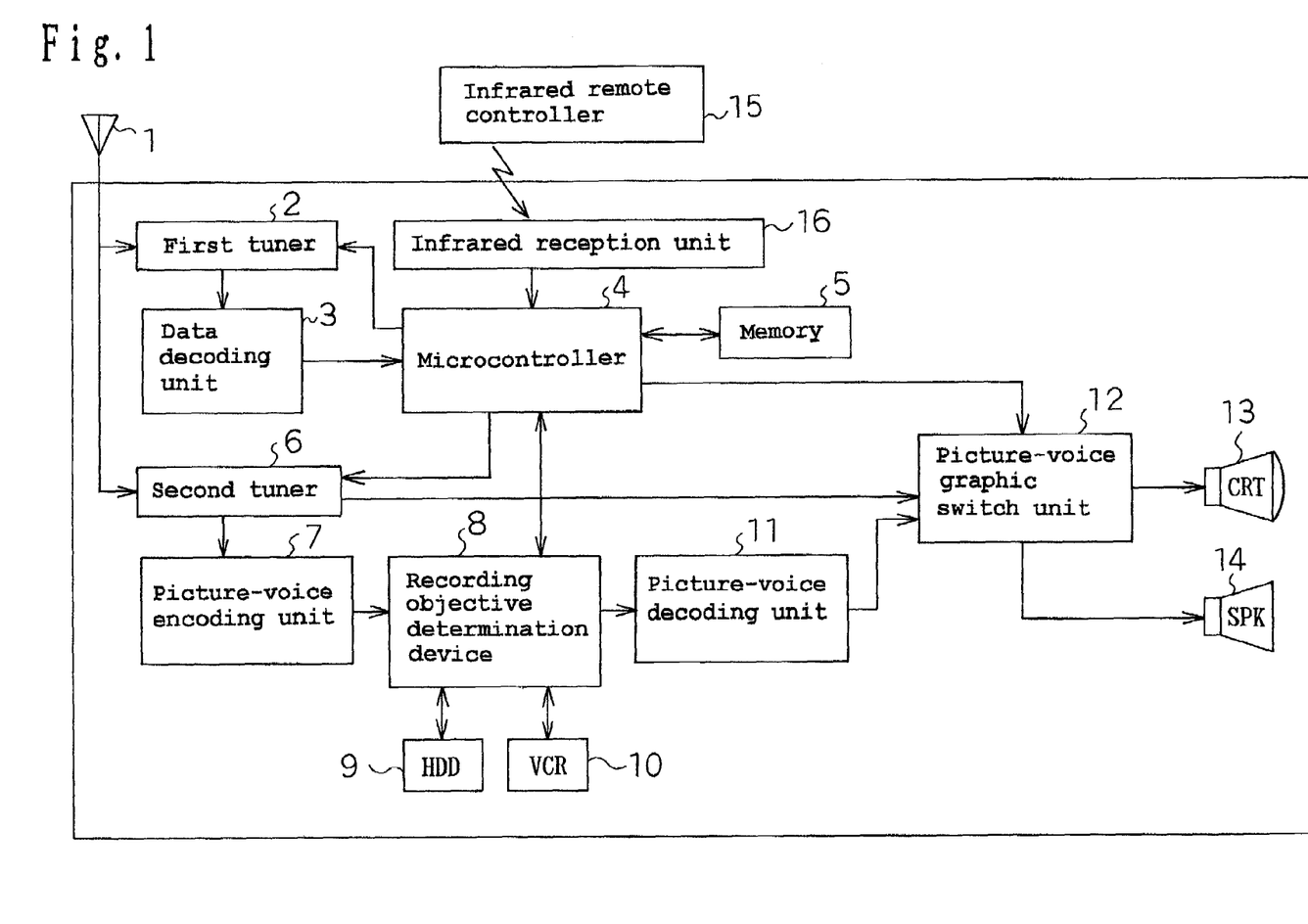
FIG. 1 is a block diagram of the data recording and reading system according to embodiment 1 of the present invention.

FIG. 1 is a block diagram of the data recording and reading system. As shown in FIG. 1, the data recording and reading system according to the first embodiment comprises an antenna 1, a first tuner 2, a data decoding unit 3, a microcontroller 4, memory 5, a second tuner 6, a picture-voice encoding unit 7, a recording objective determination device 8, an HDD 9, a VCR 10, a picture-voice decoding unit 11, a picture-voice graphic switch unit 12, a CRT (Cathode-Ray Tube) 13, a speaker 14, an infrared remote controller 15, and an infrared reception unit 16.

The antenna 1 is means of receiving an electric wave from a broadcast station, and outputting a signal generated based on the electric wave to the first tuner 2 and the second tuner 6. The first tuner 2 outputs all or a part of a digital signal from the antenna 1 to the data decoding unit 3. The data decoding unit 3 decodes a digital signal from the first tuner 2, and converts the stored data into a data format to be recorded on the HDD9 and a cassette tape in the VCR 10, and to be displayed on the CRT 13 or output as voice from the speaker 14.

The microcontroller 4 controls the recording objective determination device 8 and the picture-voice graphic switch unit 12 based on the data from the first tuner 2, the memory 5, the recording objective determination device 8, and the infrared reception unit 16. The memory 5 records data from the microcontroller 4, and predetermined data.

The second tuner 6 outputs all or a part of an analog signal from the antenna 1 to the picture-voice encoding unit 7, and the picture-voice encoding unit 7 can convert an analog signal from the second tuner 6 into a digital signal which can be recorded on the HDD 9 and the cassette tape in the VCR 10.

The recording objective determination device 8 determines whether image data is to be recorded on the HDD 9 or the VCR 10. The configuration of the recording objective determination device 8 will be described later. The HDD 9 stores image data, and contains a hard disk as a fixed type recording medium. The VCR 10 is a recording device for recording image data on a cassette tape as a removable recording medium.

The picture-voice decoding unit 11 converts a signal from the recording objective determination device 8 into a data which can be displayed on the CRT 13 and/or output as voice from the speaker 14. The picture-voice graphic switch unit 12 divides received data into image data and voice data, and outputs the image data to the CRT 13, and the voice data to the speaker 14.

Figure 2:
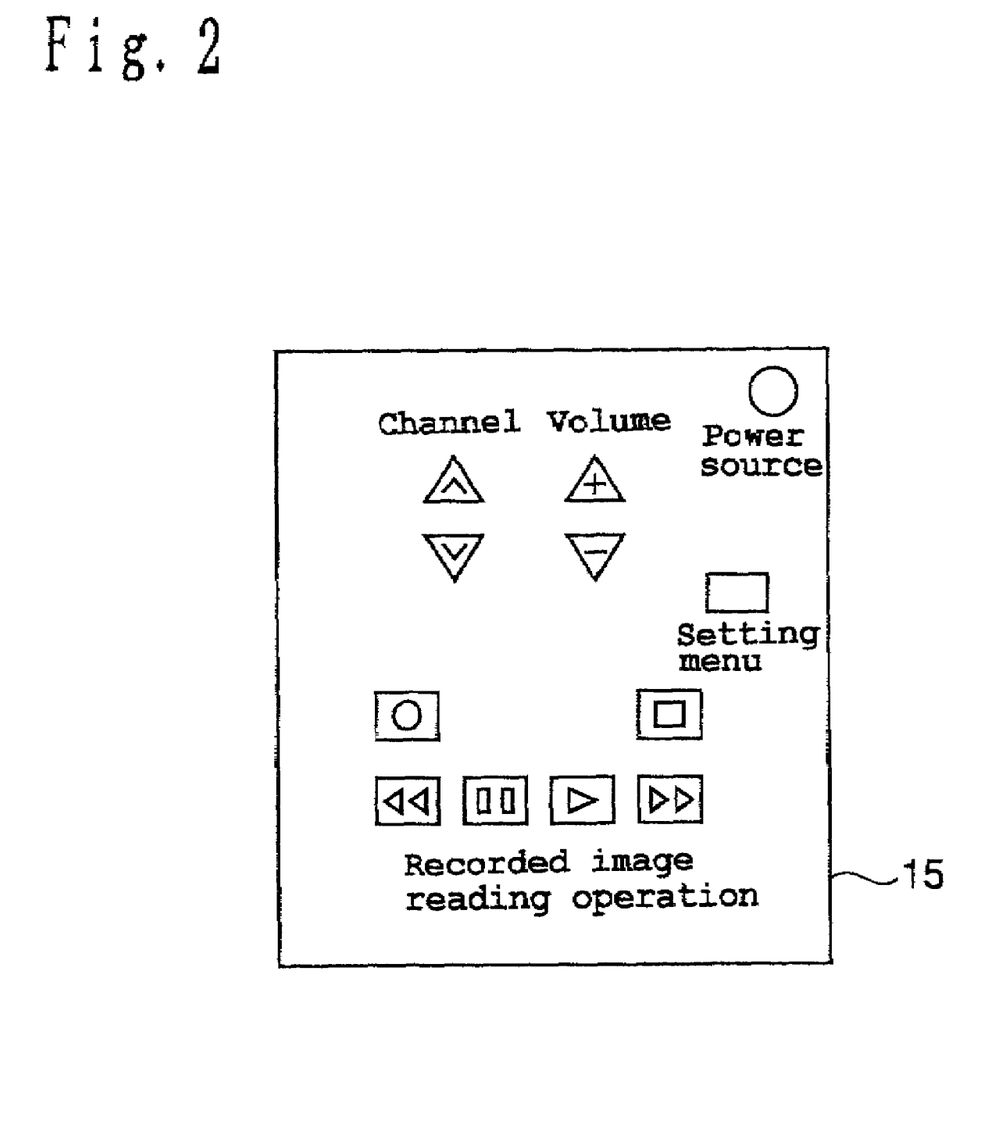
FIG. 2 shows the configuration of the infrared remote controller according to embodiment 1 of the present invention.

The CRT 13 displays received image data as an image. The speaker 14 outputs received voice data as voice. The infrared remote controller 15 has a configuration as shown in FIG. 2. A user uses the infrared remote controller 15 when performing operations such as selecting a channel, adjusting the volume of voice, recording and reading data, etc. on a remote site. The infrared remote controller 15 outputs an instruction of the user as infrared light. The infrared reception unit 16 receives infrared light from the infrared remote controller 15, and outputs the contents of a received signal to the microcontroller 4.

Described below will be the configuration of the recording objective determination device 8.

Figure 3:
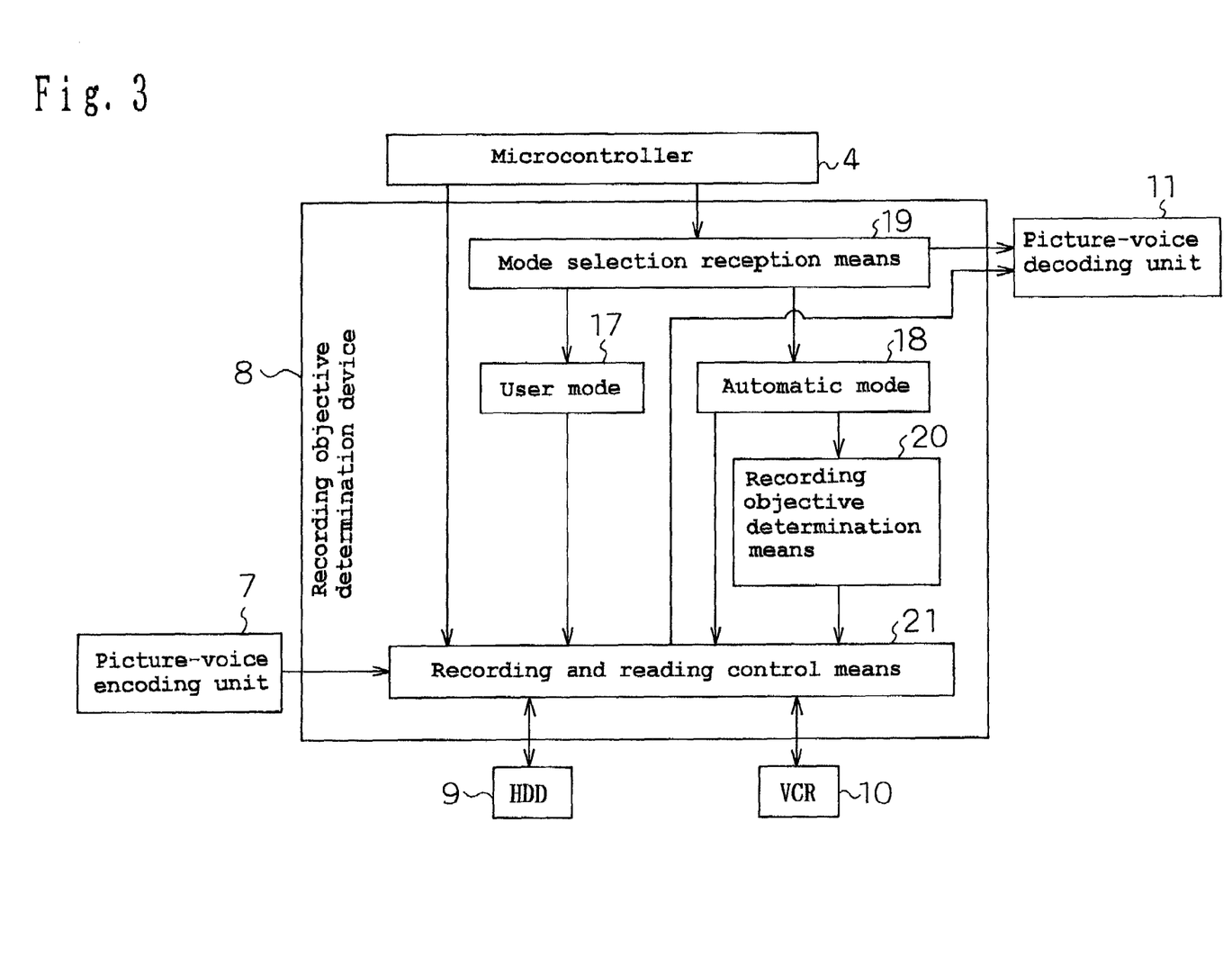
FIG. 3 is a block diagram of the recording objective determination device 8 according to embodiment 1 of the present invention.

FIG. 3 is a block diagram of the recording objective determination device 8. As shown in FIG. 3, the recording objective determination device 8 has a user mode 17 and an automatic mode 18, and comprises a mode selection reception means 19, recording objective determination means 20, and a recording and reading control means 21. In the user mode 17, a user can determine the HDD 9 or the VCR 10 as a recording device for storing image data each time data is to be stored. In the automatic mode 18, the user does not determine a recording device each time data is to be stored. That is, when a cassette tape is mounted on the VCR 10, the VCR 10 is automatically selected as a recording device for storing image data. When no cassette tape is mounted on the VCR 10, the HDD 9 is automatically selected as a recording device for storing image data.

The mode selection reception means 19 accepts a selection of a mode, that is, the user mode 17 or the automatic mode 18. When the mode selection reception means 19 accepts the automatic mode 18 as a user selection, the recording objective determination means 20 automatically determines the VCR 10 as a recording device for recording image data if a cassette tape is mounted on the VCR 10, and automatically determines the HDD 9 as a recording device for storing image data if no cassette tape is mounted on the VCR 10.

When the mode selection reception means 19 accepts the user mode 17 as a user selection, the recording and reading control means 21 records image data in a user-specified recording device. When the mode selection reception means 19 accepts the automatic mode 18 as a user selection, a recording device determined by the recording objective determination means 20 records image data. The recording and reading control means 21 has the function of checking whether or not a cassette tape is mounted on the VCR 10.

Described below will be the operations of the data recording and reading system according to the first embodiment of the present invention.

First described is the case in which the program broadcast by a broadcast station is displayed on the CRT 13 in real time, and output as voice through the speaker 14.

The user selects a program to be displayed on the CRT 13 using the infrared remote controller 15. Then, the infrared remote controller 15 outputs a user instruction as infrared light, and the infrared reception unit 16 receives the infrared light from the infrared remote controller 15, and outputs the contents of the received signal to the microcontroller 4. Then, the microcontroller 4 outputs the contents of the signal from the infrared reception unit 16 to the first tuner 2 and the second tuner 6.

When the program selected by the user is a program formed by digital signals, the first tuner 2 outputs the digital signal of the user-selected program in the digital signals from the antenna 1 to the data decoding unit 3. The data decoding unit 3 decodes the digital signal from the first tuner 2, and converts it into data which can be displayed on the CRT 13 or output as voice from the speaker 14.

The data converted by the data decoding unit 3 is input to the picture-voice graphic switch unit 12 through the microcontroller 4, and the picture-voice graphic switch unit 12 divides input data into image data and voice data, and outputs the image data to the CRT 13, and the voice data to the speaker 14. The program selected by the user is displayed on the CRT 13 in real time, and output as voice from the speaker 14.

On the other hand, when the program selected by the user is a program formed by analog signals, the second tuner 6 outputs the data of the program selected by the user in the analog signals from the antenna 1 to the picture-voice graphic switch unit 12. Then, the picture-voice graphic switch unit 12 divides the input data into image data and voice data, and outputs the image data to the CRT 13 and the voice data to the speaker 14. Thus, the program selected by the user is displayed on the CRT 13 in real time, and output as voice through the speaker 14.

Described below will be the case in which a program broadcast by a broadcast station is recorded.

When the user is recording a program to be broadcast by the broadcast station, he or she issues a record instruction using an infrared remote controller 15. Practically, the user presses a 'setting menu' button of the infrared remote controller 15. Then, the infrared remote controller 15 outputs the record instruction from the user using infrared light, and the infrared reception unit 16 receives the infrared light from the infrared remote controller 15, and outputs the contents of the received signal to the microcontroller 4. Then, the microcontroller 4 outputs the record instruction from the infrared reception unit 16 to the recording objective determination device 8.

When the mode selection reception means 19 receives the record instruction from the microcontroller 4 in the recording objective determination device 8, the mode selection reception means 19 outputs to the picture-voice decoding unit 11 the contents on the screen for inquiry to the user which the user selects, the user mode 17 in which the user determines a recording device for recording images or the automatic mode 18 in which the user does not determine a recording device, but a recording device for recording images is automatically determined in a predetermined method.

Figure 4:
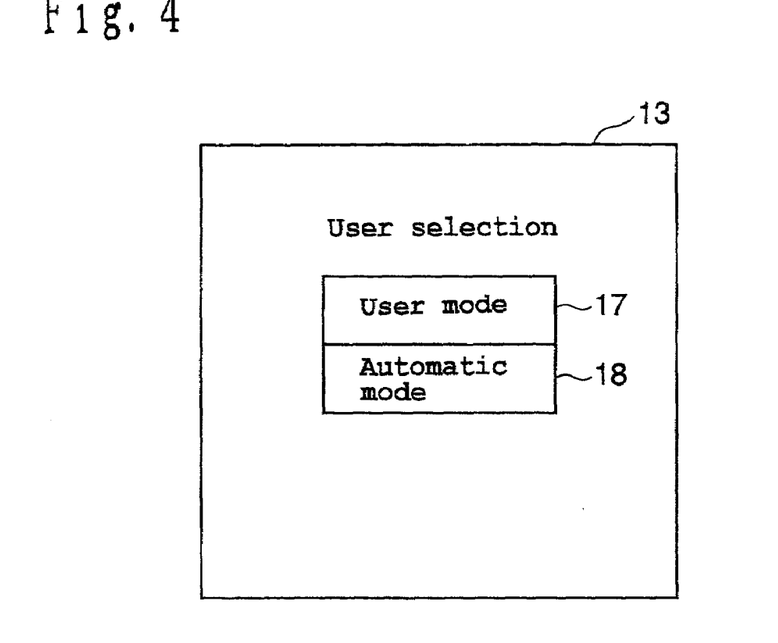
FIG. 4 shows an example of a screen on which a user is inquired which is to be selected, a user mode or an automatic mode according to embodiment 1 of the present invention.

The picture-voice decoding unit 11 inputs the 'contents on the screen for inquiry to the user' from the mode selection reception means 19, decodes the contents, and outputs the result to the picture-voice graphic switch unit 12. The picture-voice graphic switch unit 12 outputs the data from the picture-voice decoding unit 11 to the CRT 13. The CRT 13 displays the 'screen for inquiry to the user'. FIG. 4 shows an example of the screen for inquiry to the user which mode the user is selecting, the user mode 17 or the automatic mode 18.

Then, the user selects the user mode 17 or the automatic mode 18 shown in FIG. 4 using the infrared remote controller 15. For convenience in explanation, it is assumed that the user has selected the automatic mode 18. Then, the infrared remote controller 15 outputs the user-selected automatic mode 18 using infrared light. The selection of the automatic mode 18 is accepted by the mode selection reception means 19 of the recording objective determination device 8 through the infrared reception unit 16 and the microcontroller 4.

Thus, when the mode selection reception means 19 accepts the selection of the automatic mode 18, the recording and reading control means 21 checks whether or not a cassette tape is mounted on the VCR 10, and outputs the check result to the recording objective determination means 20. For simple explanation, it is assumed that a cassette tape has been mounted on the VCR 10. Then, the recording objective determination means 20 determines the VCR 10 as a recording device for recording image data so that a program from a broadcast station can be recorded on the cassette tape mounted on the VCR 10.

The program data from the broadcast station is input to the recording objective determination device 8 from the first tuner 2 or the second tuner 6 through the data decoding unit 3 and the microcontroller 4, or the picture-voice encoding unit 7 as in the case of displaying the data on the CRT 13 in real time. Then the data is recorded on the cassette tape mounted on the VCR 10 through the recording and reading control means 21 of the recording objective determination device 8.

In the description above, it is assumed for simple explanation that a cassette tape has been mounted on the VCR 10. However, when no cassette tape has been mounted on the VCR 10, the recording objective determination means 20 determines the VCR 10 as a recording device for recording image data so that the program from the broadcast station can be recorded on the HDD 9. Then, the recording and reading control means 21 inputs data to be recorded as in the case of a cassette tape mounted on the VCR 10, and records the data on the HDD 9.

When a cassette tape is mounted on the VCR 10 after the image data has been recorded on the HDD 9, or during the recording of the image data on the HDD 9, the recording and reading control means 21 reads the image data recorded on the HDD 9, and records it again on the cassette tape mounted on the VCR 10. Thus, when the cassette tape is mounted on the VCR 10, the recording and reading control means 21 controls the data recorded on the HDD 9 to be automatically recorded again on the cassette tape mounted on the VCR 10. Therefore, the user is not required to retrieve the image data recorded on the HDD 9 and to copy the data again on the cassette tape mounted on the VCR 10.

Another method of the recording and reading control means 21 recording again the data temporarily recorded on the HDD 9 on the cassette tape mounted on the VCR 10 is to sequentially record all data input by the recording and reading control means 21 temporarily on the HDD 9, to allow the HDD 9 to read data in time sharing parallel to the recording operation, to sequentially read the data recorded on the HDD 9, and to record the program data on the cassette tape from the start.

A further method is to record all program data on the HDD 9, read the data, and record it on a cassette tape from the start of the program data.

Otherwise, when a cassette tape is mounted on the VCR 10, the recording and reading control means 21 records on the cassette tape, not on the HDD 9, the data input after mounting the tape, reads the data recorded on the HDD 9 after a program ends, records it on the cassette tape, and edits the program data such that it can be recorded on the cassette tape in order from the beginning.

In the explanation above, for convenience in explanation, the user selects the automatic mode 18 from between the user mode 17 and the automatic mode 18 shown in FIG. 4 when a program is to be recorded. However, when the user selects the user mode 17, the selection information is accepted by the mode selection reception means 19 of the recording objective determination device 8 as in case of selecting the automatic mode 18.

When the mode selection reception means 19 receives the selection of the user mode 17, the mode selection reception means 19 outputs to the picture-voice decoding unit 11 the contents on the screen for inquiry to the user which is to be selected, the HDD 9 or the VCR 10, as a recording device for recording data. The process is performed as in the case of inquiring the user which is to be used, the user mode 17 or the automatic mode 18.

Figure 5:
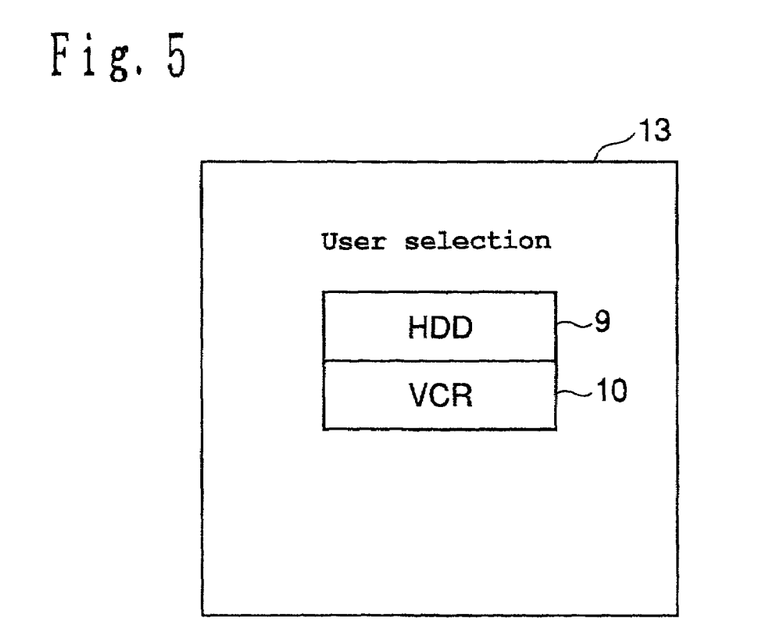
FIG. 5 shows an example of a screen on which a user is inquired which is selected, an HDD or a VCR according to embodiment 1 of the present invention.

Then, the CRT 13 displays a 'screen for inquiry to the user which is to be selected, the HDD 9 or the VCR 10'. FIG. 5 shows an example of a screen for inquiry to the user which is to be selected, the HDD 9 or the VCR 10. Assuming that the user has selected the VCR 10, the selection is accepted by the mode selection reception means 19 of the recording objective determination device 8 through the infrared remote controller 15, the infrared reception unit 16, and the microcontroller 4, and the program is recorded on the cassette tape in the VCR 10.

On the other hand, if the user selects the HDD 9, the selection is similarly accepted by the mode selection reception means 19, and the program is recorded on the HDD 9.

Described below will be the case in which a program recorded on the cassette tape mounted on the VCR 10 or on the HDD 9 is read.

When the user is reading a program recorded on the cassette tape or the HDD 9, he or she issues a read instruction using the infrared remote controller 15. Then, the infrared remote controller 15 outputs a read instruction of the user using the infrared light, and the infrared reception unit 16 receives the infrared light from the infrared remote controller 15, and outputs the contents of a received signal to the microcontroller 4. Then, the microcontroller 4 outputs a read instruction from the infrared reception unit 16 to the recording objective determination device 8.

When the recording and reading control means 21 receives a read instruction from the microcontroller 4 in the recording objective determination device 8, the recording and reading control means 21 reads the cassette tape mounted on the VCR 10 or the HDD 9, and the read signal is output to the picture-voice decoding unit 11. The picture-voice decoding unit 11 converts a signal from the recording and reading control means 21 of the recording objective determination device 8 into the data which can be displayed on the CRT 13, or output as voice through the speaker 14, and outputs the result to the picture-voice graphic switch unit 12.

The picture-voice graphic switch unit 12 divides the data input from the picture-voice decoding unit 11 into image data and voice data, and outputs the image data to the CRT 13, and the voice data to the speaker 14. Thus, the CRT 13 displays a read picture, and the speaker 14 outputs read voice.

According to the above mentioned embodiment 1, the HDD 9 and the VCR 10 are used as recording devices. However, the recording device is not limited to the HDD 9 and the VCR 10. It can be any recording device so far as there are a plurality of or any number of recording devices. For example, all recording devices can be HDDs and VCRs. It is not necessary to store the plurality of recording devices in one case, and the recording devices can be connected through a transmission network predetermined by the IEEE 1394, etc., or through a global network such as Internet. In addition, the data recording system according to the present invention is configured by the HDD 9, the VCR 10, and the recording objective determination device 8 according to the embodiment 1 described above.

Furthermore, according to the above mentioned embodiment 1, a cassette tape is used as a removable recording medium. However, the removable recording medium can be other media such as an optical disk, a magnetic disk, etc. In this case, it is necessary to replace the VCR 10 with a recording device corresponding to other removable recording media such as an optical disk, a magnetic disk, etc.

Furthermore, according to the above mentioned embodiment 1, the HDD 9 is used as a recording device for recording data on a fixed type recording medium. However, a recording device for recording data on a fixed type recording medium is not limited to the HDD 9.

Additionally, according to the above mentioned embodiment 1, the recording objective determination device 8 has the user mode 17 and the automatic mode 18. However, the recording objective determination device 8 can have only the automatic mode 18. In this case, when a user issues a record instruction, the recording objective determination device 8 automatically determines as a recording device a cassette tape if it is mounted on the VCR 10, and the HDD 9 if no cassette tape is mounted on the VCR 10.

According to the above mentioned embodiment 1, the recording objective determination device 8 determines a recording device depending on whether or not a cassette tape is mounted on the VCR 10. However, regardless of whether or not a cassette tape is mounted on the VCR 10, the VCR 10 or the HDD 9 can be determined as a recording objective. In this case, if the VCR 10 is determined as a recording device, and no cassette tape is mounted on the VCR 10, then data is not recorded although the user has issued a record instruction.

Furthermore, according to the above mentioned embodiment 1, the recording and reading control means 21 of the recording objective determination device 8 has the function of checking whether or not a cassette tape has been mounted on the VCR 10, but the means for checking whether or not a cassette tape has been mounted on the VCR 10 can be provided independently of the recording and reading control means 21.

According to the above mentioned embodiment 1, the recording objective determination device 8 determines a recording device depending on whether or not a cassette tape has been mounted on the VCR 10. However, a predetermined recording device can be automatically determined as a recording objective for recording data when the user has issued a record instruction. A user-predetermined recording device can be the VCR 10 or the HDD 9.

In addition, the recording objective determination device 8 according to the above mentioned embodiment 1 can determine a recording device for recording data when a user reserves a recording process, or when the recording process actually starts. If the user is recording data in real time, the recording device for recording data is determined when the recording process is performed.

Figure 6:
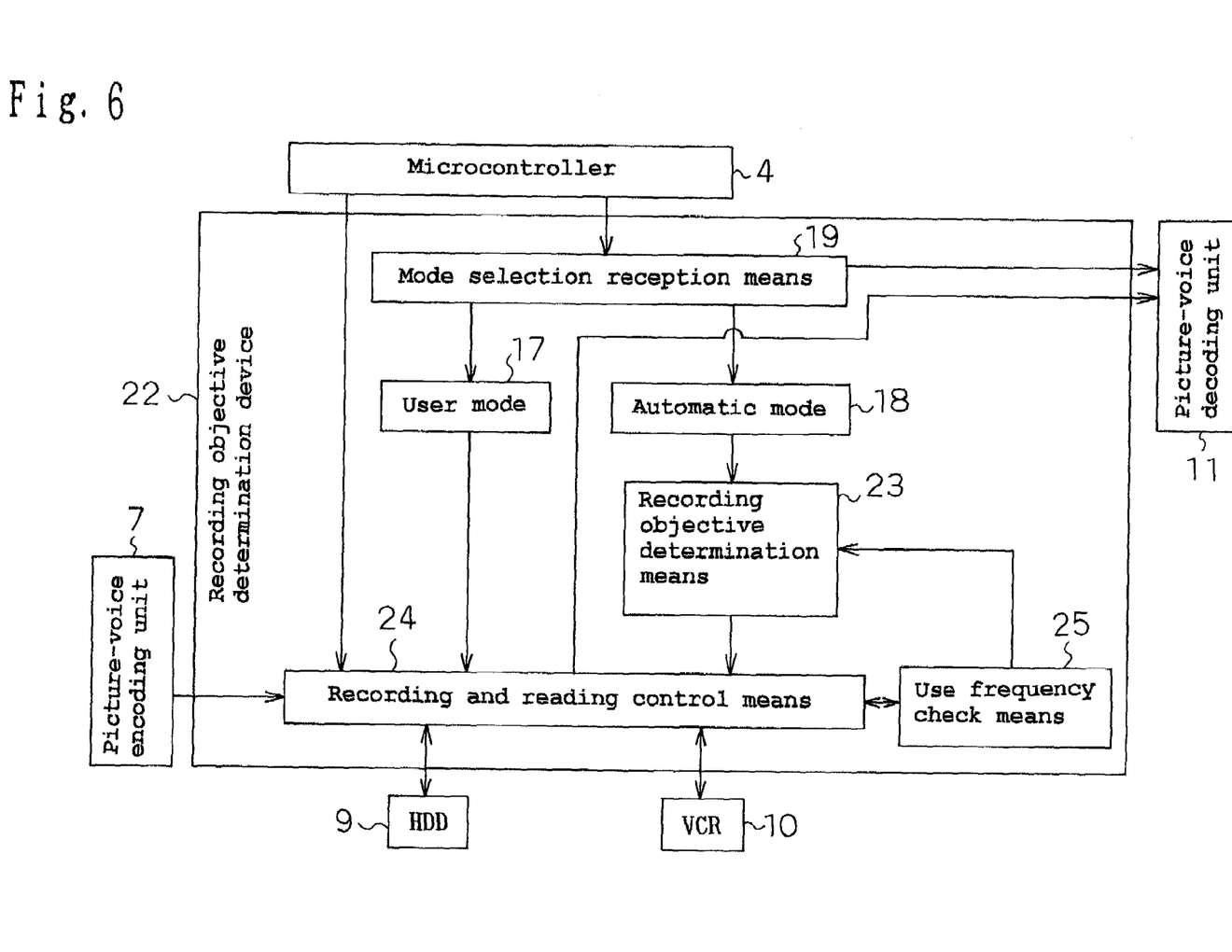
FIG. 6 is a block diagram of a recording objective determination device 22 according to an embodiment of the present invention.

The recording objective determination device 8 according to the above mentioned embodiment 1 can be replaced with the recording objective determination device 22 shown in FIG. 6. The recording objective determination device 22 has the user mode 17 and the automatic mode 18, and comprises the mode selection reception means 19, recording objective determination means 23, recording and reading control means 24, and use frequency check means 25.

In the recording objective determination device 22, the use frequency check means 25 checks which has been used more frequently as a recording device, the HDD 9 or the VCR 10, and the recording objective determination means 23 determines a recording device which has been used more frequently as a recording device for recording data. For example, when the user prefers the HDD 9, the use frequency of the HDD 9 is higher than the use frequency of the VCR 10. Therefore, the recording objective determination means 23 determines the HDD 9 as a recording device for recording data.

The recording and reading control means 24 of the recording objective determination device 22 shown in FIG. 6 has the function obtained by subtracting the function of checking whether or not a cassette tape has been mounted on the VCR 10 from the function of the recording and reading control means 21 in the recording objective determination device 8 shown in FIG. 3. The user mode 17, the automatic mode 18, and the mode selection reception means 19 are the same as the corresponding functions in the recording objective determination device 8.

In the above mentioned embodiment 1, the recording objective determination device 8 determines a recording device depending on whether or not a cassette tape has been mounted on the VCR 10. However, although a cassette tape has been mounted on the VCR 10, the recording objective determination device 8 does not determine the VCR 10 as a recording device for recording data if the remaining recording capacity of the cassette tape is equal to or smaller than a predetermined capacity, or it is prohibited to newly record data on the cassette tape.

In this case, as in the case when no cassette tape is mounted on the VCR 10, data is recorded on the HDD 9, and, after a cassette tape having a remaining recording capacity larger than a predetermined capacity has been mounted on the VCR 10, or after a cassette tape permitted to newly record data has been mounted on the VCR 10, the data recorded on the HDD 9 can be copied to the cassette tape newly mounted on the VCR 10.

A method of re-recording the copied data, that is, the data temporarily recorded on the HDD 9, on the cassette tape newly mounted on the VCR 10 can be the above mentioned method of re-recording data on a cassette tape when no cassette tape is mounted on the VCR 10, and a cassette tape is mounted on the VCR 10 after data has been recorded on the HDD 9, or during data is being recorded on the HDD 9.

When the recording objective determination device 8 or the recording objective determination device 22 determines the HDD 9 as a recording device for recording data, the HDD 9 can be set not to record data if the remaining recording capacity of the HDD 9 is equal to or smaller than a predetermined capacity or it is prohibited to newly record data on the HDD 9. In this case, it is recommended that the user is notified of the information.

Further, the present invention is a program for causing a computer to perform the function of all or a part of the means of the above-mentioned the recording objective determination device of the present invention, and hence a program working in cooperation with the computer.

Here, "a part of the means of the present invention" indicates either a certain number of pieces of the plural pieces of the means thereof or a part of the function of a piece of means.

Further, a computer readable recording medium having recorded a program of the present invention is included within the scope of the present invention.

In an embodiment of the use of a program of the present invention, the program may be recorded on a computer readable recording medium thereby to work in cooperation with a computer.

Further, in an embodiment of the use of a program of the present invention, the program may be transferred through a transferring medium, and read by a computer thereby to work in cooperation with the computer.

The media include a ROM, while the transferring media include a transferring medium such as the Internet, light, radio waves, and sound waves.

Further, the computer of the present invention referred above is not limited pure hardware such as CPU or the like, and it may include firmware, operating system, I/O devices and peripheral devices.

Further, as described above, the configuration of the present invention may be implemented by a software or a hardware.

As apparent from the explanation above, the present invention can provide a recording objective determination device for automatically determine a recording device for recording data in a predetermined method without having a user determine it each time data is to be recorded, and a data recording system comprising the recording objective determination device and a plurality of recording devices.

What is claimed is:

1. A data recording system, comprising:
   a plurality of recording devices for recording data containing images and/or voice in a prescribed recording medium, each of the recording devices directly recording data from outside the data recording system and playing back data to outside the data recording system; and
   a recording objective determination device comprising at least a recording objective determination means for determining by a predetermined method, a specific one of said recording devices for recording the data among said plurality of recording devices, wherein
   said recording objective determination means automatically decides which recording device should record among said plurality of recording devices by said predetermined method:
   at least one of said plurality of recording devices is a recording device recording the data on a removable recording medium mounted on the device, and at least another recording device of said plurality of recording devices is a recording device using a fixed type recording medium; and
   when said recording device for recording data, determined by said recording objective determination means is said recording device using a removable recording medium, and said recording objective determination device further comprises control means for causing data to be recorded on the fixed type recording medium of said recording device using the fixed type recording medium in the predetermined case.

2. A recording objective determination device, comprising:
   recording objective determination means of determining by a predetermined method, a specific one of the recording devices for recording data among a plurality of recording devices each of which records data containing images and/or voice in a recording medium, each of the recording devices directly recording data from outside the data recording system and playing back data to outside the data recording system wherein when the data is recorded, the data is recorded in said recording medium of said recording device determined by said recording objective determination means, and said recording objective determination means automatically decides which recording device should record among said plurality of recording devices by said predetermined method;
   at least one of said plurality of recording devices is a recording device recording the data on a removable recording medium mounted on the device, and at least another recording device of said plurality of recording devices is a recording device using a fixed type recording medium; and
   when said recording device for recording data, determined by said recording objective determination means is said recording device using a removable recording medium, and
   said recording objective determination device further comprises control means for causing data to be recorded on the fixed type recording medium of said recording device using the fixed type recording medium in the predetermined case.

3. The recording objective determination device according to claim 2, wherein said predetermined method is to select any of said plurality of recording devices predetermined by a user.

4. The recording objective determination device according to claim 3, wherein
   at least one of said plurality of recording devices is a recording device using a removable recording medium of recording the data in a removable recording medium mounted on the device; and
   said recording device selected in advance by the user is said recording device using a removable recording medium.

5. The recording objective determination device according to claim 2, wherein
   a mode is provided in which said user can optionally select a recording device for recording the data; and
   said recording objective determination device further comprising selection receipt means of accepting a selection of the user as to which mode is to be selected, a mode in which said recording objective determination means selects a recording device and a mode in which the user optionally selects a recording device.

6. A recording objective determination device comprising:
   recording objective determination means of determining by a predetermined method, a specific one of the recording devices for recording data among a plurality of recording devices each of which records data containing images and/or voice in a recording medium, each of the recording devices directly recording data from outside the data recording system and playing back data to outside the data recording system;
   wherein when the data is recorded, the data is recorded in said recording medium of said recording device determined by said recording objective determination means, and
   wherein said recording objective determination means automatically decides which recording device should record among said plurality of recording devices by said predetermined method;
   wherein a mode is provided in which said user can optionally select a recording device for recording the data; and
   wherein said recording objective determination device further comprising selection receipt means of accepting a selection of the user as to which mode is to be selected, a mode in which said recording objective determination means selects a recording device and a mode in which the user optionally selects a recording device, the recording objective determination device further comprising use frequency check means of checking a use frequency of each of said plurality of recording devices in the past, wherein when said selection receipt means accepts the user selection of the mode in which said recording objective determination means determines a recording device, said recording objective determination means selects a recording device having a highest use frequency checked by said use frequency check means as a predetermined method.

7. A recording objective determination device, comprising at least:

recording objective determination means of determining by a predetermined method, a specific one of the recording devices for recording data among a plurality of recording devices each of which records data containing images and/or voice in a recording medium, each of the recording devices directly recording data from outside the data recording system and playing back data to outside the data recording system, wherein when the data is recorded, the data is recorded in said recording medium of said recording device determined by said recording objective determination means, said recording objective determination means automatically decides which recording device should record among said plurality of recording devices by said predetermined method, wherein at least one of said plurality of recording devices is a recording device using a removable recording medium of recording the data in a removable recording medium mounted on the device; and said predetermined method refers to a method of selecting said recording device using a removable recording medium when said removable recording medium is mounted on said recording device using a removable recording medium.

8. The recording objective determination device according to claim 2, wherein when a remaining recording capacity of said recording medium in said recording device for recording objective determined by said recording objective determination means is equal to or smaller than a predetermined capacity, or when it is prohibited that data is newly recorded in said recording medium, said recording medium of said selected recording device for recording data does not record the data.

9. A recording objective determination device according to claim 2 wherein the elements and functions described are encoded as computer readable code stored on a computer readable medium as a program which when executed by a computer causes it to be configured and function as a said recording objective determination device.

10. The recording objective determination device according to claim 2, wherein (1) after the removable recording medium is mounted on said recording device using a removable recording medium, or (2) after the removable recording medium having a predetermined amount of remaining recording capacity is mounted on said recording device using a removable recording medium, or (3) after the removable recording medium permitted to record new data is mounted on said recording device using a removable recording medium, the data recorded in the fixed type recording medium can be recorded in the removable recording medium.

11. The recording objective determination device according to claim 2 wherein the predetermined case is that no recording medium is mounted on said recording device using a removable recording medium.

12. The recording objective determination device according to claim 2 wherein the predetermined case is that a remaining recording capacity of the mounted removable recording medium is equal to or smaller than a predetermined capacity.

13. The recording objective determination device according to claim 2 wherein the predetermined case is that it is prohibited that data is newly recorded in said mounted removable recording medium.

14. The recording objective determination device according to claim 6, wherein said predetermined method is to select any of said plurality of recording devices predetermined by a user.

15. The recording objective determination device according to claim 14, wherein at least one of said plurality of recording devices is a recording device using a removable recording medium of recording the data in a removable recording medium mounted on the device; and said recording device selected in advance by the user is said recording device using a removable recording medium.

16. The recording objective determination device according to claim 6, wherein a mode is provided in which said user can optionally select a recording device for recording the data; and said recording objective determination device further comprising selection receipt means of accepting a selection of the user as to which mode is to be selected, a mode in which said recording objective determination means selects a recording device and a mode in which the user optionally selects a recording device.

17. The recording objective determination device according to claim 6, wherein at least one of said plurality of recording devices is a recording device using a removable recording medium of recording the data in a removable recording medium mounted on the device; and said predetermined method refers to a method of selecting said recording device using a removable recording medium when said removable recording medium is mounted on said recording device using a removable recording medium.

18. The recording objective determination device according to claim 6, wherein when a remaining recording capacity of said recording medium in said recording device for recording objective determined by said recording objective determination means is equal to or smaller than a predetermined capacity, or when it is prohibited that data is newly recorded in said recording medium, said recording medium of said selected recording device for recording data does not record the data.

19. The recording objective determination device according to claim 6, wherein at least one of said plurality of recording devices is a recording device recording the data on a removable recording medium mounted on the device, and at least another recording device of said plurality of recording devices is a recording device using a fixed type recording medium; and when said recording device for recording data, determined by said recording objective determination means is said recording device using a removable recording medium, and said recording objective determination device further comprises control means for causing data to be recorded on the fixed type recording medium of said recording device using the fixed type recording medium in the predetermined case.

20. A recording objective determination device according to claim 6 wherein the elements and functions described are encoded as computer readable code stored on a computer readable medium as a program which when executed by a computer causes it to be configured and function as a said recording objective determination device.

21. The recording objective determination device according to claim 19, wherein (1) after the removable recording medium is mounted on said recording device using a removable recording medium, or (2) after the removable recording medium having a predetermined amount of remaining recording capacity is mounted on said recording device using a removable recording medium, or (3) after the removable recording medium permitted to record new data is mounted on said recording device using a removable recording medium, the data recorded in the fixed type recording medium can be recorded in the removable recording medium.

22. The recording objective determination device according to claim 19 wherein the predetermined case is that no recording medium is mounted on said recording device using a removable recording medium.

23. The recording objective determination device according to claim 19 wherein the predetermined case is that a remaining recording capacity of the mounted removable recording medium is equal to or smaller than a predetermined capacity.

24. The recording objective determination device according to claim 19 wherein the predetermined case is that it is prohibited that data is newly recorded in said mounted removable recording medium.

25. The recording objective determination device according to claim 7, wherein said predetermined method is to select any of said plurality of recording devices predetermined by a user.

26. The recording objective determination device according to claim 25, wherein at least one of said plurality of recording devices is a recording device using a removable recording medium of recording the data in a removable recording medium mounted on the device; and said recording device selected in advance by the user is said recording device using a removable recording medium.

27. The recording objective determination device according to claim 7, wherein a mode is provided in which said user can optionally select a recording device for recording the data; and said recording objective determination device further comprising selection receipt means of accepting a selection of the user as to which mode is to be selected, a mode in which said recording objective determination means selects a recording device and a mode in which the user optionally selects a recording device.

28. The recording objective determination device according to claim 7, wherein at least one of said plurality of recording devices is a recording device using a removable recording medium of recording the data in a removable recording medium mounted on the device; and said predetermined method refers to a method of selecting said recording device using a removable recording medium when said removable recording medium is mounted on said recording device using a removable recording medium.

29. The recording objective determination device according to claim 7, wherein when a remaining recording capacity of said recording medium in said recording device for recording objective determined by said recording objective determination means is equal to or smaller than a predetermined capacity, or when it is prohibited that data is newly recorded in said recording medium, said recording medium of said selected recording device for recording data does not record the data.

30. The recording objective determination device according to claim 7, wherein at least one of said plurality of recording devices is a recording device recording the data on a removable recording medium mounted on the device, and at least another recording device of said plurality of recording devices is a recording device using a fixed type recording medium; and when said recording device for recording data, determined by said recording objective determination means is said recording device using a removable recording medium, and said recording objective determination device further comprises control means for causing data to be recorded on the fixed type recording medium of said recording device using the fixed type recording medium in the predetermined case.

31. A recording objective determination device according to claim 7 wherein the elements and functions described are encoded as computer readable code stored on a computer readable medium as a program which when executed by a computer causes it to be configured and function as a said recording objective determination device.

32. The recording objective determination device according to claim 30, wherein (1) after the removable recording medium is mounted on said recording device using a removable recording medium, or (2) after the removable recording medium having a predetermined amount of remaining recording capacity is mounted on said recording device using a removable recording medium, or (3) after the removable recording medium permitted to record new data is mounted on said recording device using a removable recording medium, the data recorded in the fixed type recording medium can be recorded in the removable recording medium.

33. The recording objective determination device according to claim 30 wherein the predetermined case is that no recording medium is mounted on said recording device using a removable recording medium.

34. The recording objective determination device according to claim 30 wherein the predetermined case is that a remaining recording capacity of the mounted removable recording medium is equal to or smaller than a predetermined capacity.

35. The recording objective determination device according to claim 30 wherein the predetermined case is that it is prohibited that data is newly recorded in said mounted removable recording medium.

* * * * *